(12) United States Patent
Kurtz et al.

(10) Patent No.: US 7,889,955 B2
(45) Date of Patent: *Feb. 15, 2011

(54) MICROMACHINED OPTICAL PRESSURE SENSOR

(75) Inventors: Anthony D. Kurtz, Saddle River, NJ (US); Boaz Kochman, New York, NY (US); Joseph Van DeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 39 days.

This patent is subject to a terminal disclaimer.

(21) Appl. No.: 12/075,922

(22) Filed: Mar. 14, 2008

(65) Prior Publication Data

US 2008/0175529 A1 Jul. 24, 2008

Related U.S. Application Data

(63) Continuation of application No. 11/014,007, filed on Dec. 16, 2004, now Pat. No. 7,440,645.

(60) Provisional application No. 60/592,171, filed on Jul. 29, 2004.

(51) Int. Cl.
*G02B 6/00* (2006.01)

(52) U.S. Cl. ....................................... 385/13

(58) Field of Classification Search .................... 381/13
See application file for complete search history.

(56) References Cited

U.S. PATENT DOCUMENTS

| 4,899,042 A | * | 2/1990 | Falk et al. .............. 250/227.19 |
| 5,891,747 A | * | 4/1999 | Farah .......................... 438/31 |
| 5,891,751 A | | 4/1999 | Kurtz et al. |
| 2003/0107095 A1 | | 6/2003 | Kurtz |
| 2003/0107096 A1 | * | 6/2003 | Kurtz et al. .................. 257/414 |

OTHER PUBLICATIONS

Ahmad et al., Ultracompact Corner-Mirrors and T-Branches in Silicon-on-Insulator, IEEE Photonics Technology Letters, vol. 14, No. 1, pp. 65-67 (2002).
Espinola et al., Fast and Low Power Thermo-Optic Switch on Thin Silicon-on-Insulator, IEEE Photonics Technology Letters, vol. XX, No. Y, pp. 100-102, (2002).
Pavelescu et al., Analysis and modeling of silicon micromachined Mach-Zehnder interferometer for pressure sensing, J. Micromech. Microeng., 7, pp. 214-217, (1997).
Espinola et al., A study of high-index contrast 90 degree waveguide bend structures, Optics Express, vol. 8, No. 9, pp. 517-528, (2001).

* cited by examiner

*Primary Examiner*—Uyen-Chau N Le
*Assistant Examiner*—Hoang Tran
(74) *Attorney, Agent, or Firm*—James E. Schutz, Esq.; Troutman Sanders LLP

(57) ABSTRACT

A pressure sensor including: a deflectable diaphragm including a substantially central boss and channel; and, an optical waveguide having first and second arms, wherein the first arm is substantially aligned with an edge of the boss and the second arm is substantially aligned with an edge of the channel.

16 Claims, 2 Drawing Sheets

# MICROMACHINED OPTICAL PRESSURE SENSOR

RELATED APPLICATION

This application claims priority of U.S. Patent Application Ser. No. 60/592,171, entitled MICROMACHINED OPTICAL PRESSURE SENSOR, filed Jul. 29, 2004, the entire disclosure of which is hereby incorporated by reference as being set forth in its entirety herein.

This application is a continuation of U.S. patent application Ser. No. 11/014,007, entitled MICROMACHINED OPTICAL PRESSURE SENSOR, filed Dec. 16, 2004, the entire disclosure of which is hereby incorporated by reference as if being set forth in its entirety herein. Unites States patent application Ser. No. 11/014,007, filed Dec. 16, 2004, is a non-provisional of U.S. Patent Application Ser. No. 60/592, 171, entitled MICROMACHINED OPTICAL PRESSURE SENSOR, filed Jul. 29, 2004, the entire disclosure of which is hereby incorporated by reference as being set forth in the its entirety herein.

FIELD OF THE INVENTION

The present invention relates generally to pressure sensing.

BACKGROUND OF THE INVENTION

As one will ascertain, pressure transducers have achieved widespread acceptance and use. The present invention is directed to a device that provides signal output indicative of a sensed pressure.

SUMMARY OF THE INVENTION

A pressure sensor including: a deflectable diaphragm having a substantially central boss and channel; and, an optical waveguide having first and second arms, wherein the first arm is substantially aligned with an edge of the boss and the second arm is substantially aligned with an edge of the channel.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts, and.

DETAILED DESCRIPTION OF THE INVENTION

It is to be understood that the figures and descriptions of the present invention have been simplified to illustrate elements that are relevant for a clear understanding of the present invention, while eliminating, for the purpose of clarity, many other elements found in typical pressure sensing systems and methods of making and using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

According to an aspect of the present invention, an optical pressure sensor based on an interferometer may be provided and operated. For example, according to an aspect of the present invention, a Mach-Zehnder interferometer (MZI) may be used. For non-limiting purposes of explanation only, an MZI generally includes two Y-junctions that provide for an equal division of input optical power and subsequent recombination thereof. Without biasing, the input optical power is split into the two arms by the first Y-junction, and arrives at the second Y-junction in-phase for recombination. This provides a maximum signal intensity on the MZI waveguide output. However, when the MZI is biased, such as by using the electro-optic or piezo-optic effect, a differential phase change is induced across the arms of the MZI. Recombination of the injected signal by the second Y-junction thus causes constructive and/or destructive interference between the optical signals propagating down the two arms of the MZI. Thus, intensity of signals on the output waveguide is affected based upon biasing of the MZI. These output signals, and their intensities, may be measured using any suitable sensor, such as a photosensor like one or more photo-diodes, for example.

Figure 1:
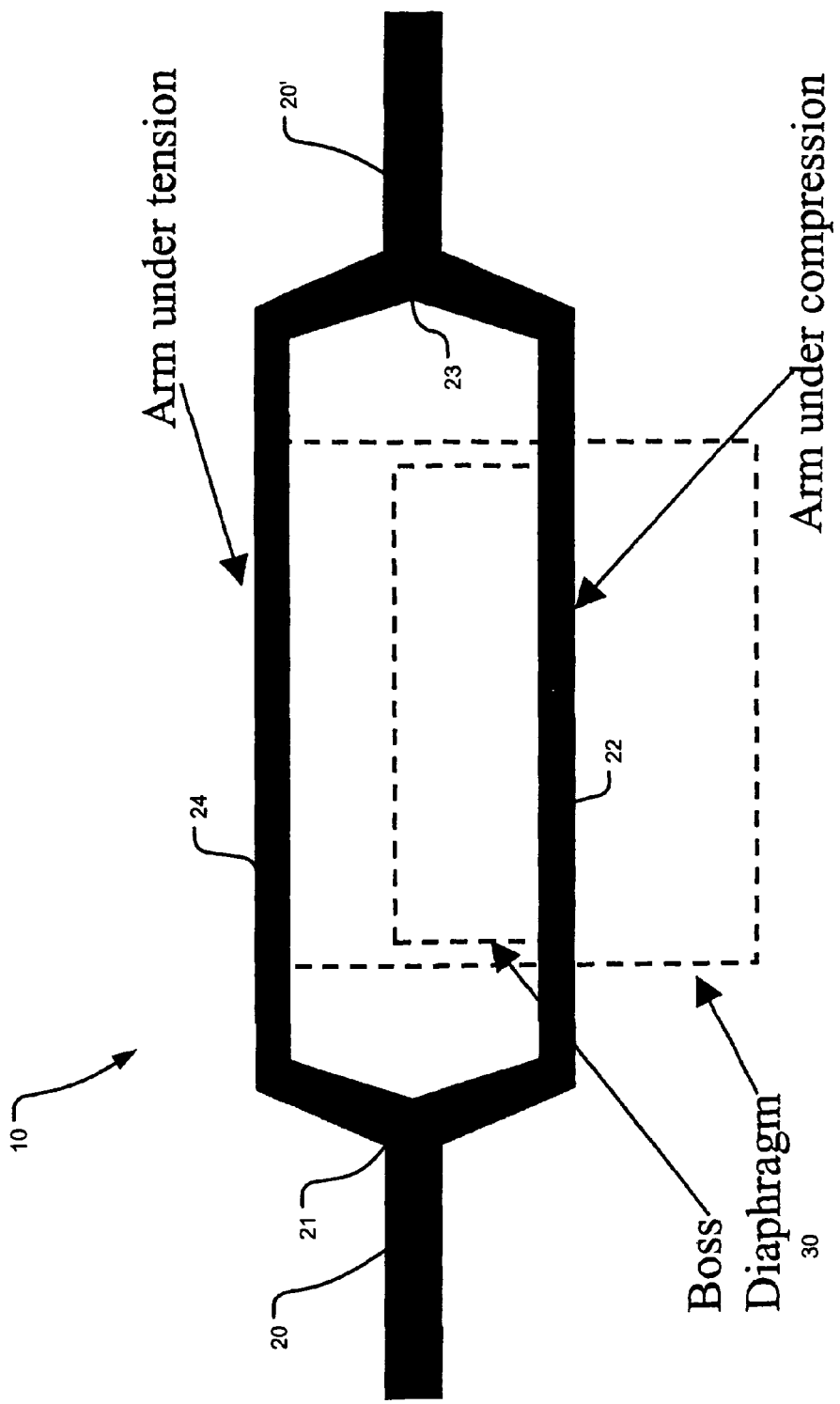
FIG. 1 illustrates a plan view of a system according to an aspect of the present invention; and, FIG. 2 illustrates a cross-sectional diagrammatic view of the system of FIG. 1.

According to an aspect of the present invention, an optical pressure sensor based on a silicon micromachined Mach-Zehnder interferometer (MZI) may be provided and operated. Referring now to FIG. 1, there is shown a plan diagrammatic view of a system 10 according to an aspect of the present invention. System 10 generally includes a waveguide 20 forming an MZI, and boss diaphragm 30. Generally, the MZI may be used to determine the phase shift caused by a difference in the optical paths of two beams from a coherent light source, such as a laser. Waveguide 20 splits into two substantially parallel waveguides 22, 24 at a first Y-junction 21, and then recombines into a single waveguide 20' at a second Y-junction 23 some distance further along. Where the two arms 22, 24 of the interferometer are of equal length, the optical pathlengths are the same when the boss diaphragm 30 is unstressed. In this way, light propagating along waveguide 20 splits into the two arms 22, 24, and then recombines in-phase for maximum light output on waveguide 20'.

According to an aspect of the present invention, waveguide 20 may take the form of a silicon ridge waveguide surrounded, or cladded, by $SiO_2$. The light transmitting silicon may be made of any crystallographic orientation, which can be chosen in such a way to maximize the piezo-optic coefficient. Of course, other waveguiding material combinations may be used. That being said, the present invention will be further discussed with regard to $Si/SiO_2$ waveguiding systems for non-limiting purposes of explanation only.

Because Si is transparent to infrared light, an infrared light source, such as a laser having a central operating wavelength in the infrared range may be particularly well suited for use. For example, a laser system having a central wavelength between about 0.7 μm and about 350 μm may be suitable. By way of further example, an InGaAsP based laser operating at a central wavelength of about 1.55 μm may be well suited for use with the present invention.

The difference in index of refraction between the Si waveguide and the $SiO_2$ confining layer(s) may be substantially large to cause strong confinement to the waveguiding core. For example, the difference in the refractive indices of the core and confinement layers (Δn) may be about 2, or even greater. By way of further, non-limiting example only, the refractive index of the core may be about 3.5 at an operating wavelength of about 1.55 μm, while the refractive index of the cladding layers may be about 1.5 at the same operating wavelength.

According to an aspect of the present invention, an about 12 μm wide single-mode striploaded waveguide having an about 0.3 μm thick Si core positioned or cladded between SiO$_2$ cladding layers, all integrated with a silicon wafer, may be used. Of course, other waveguide configurations, such as ridge waveguides, may also be used. The lower cladding may be about 1 or 2 μm thick, and the upper cladding may be at least about 0.5 μm thick, for example.

A silicon-on-insulator (SOI), such as a silicon-on-oxide, structure may be used. A silicon layer over a SiO$_2$ containing structure may be patterned into the interferometer shape, so as to define waveguide 20 and arms 22, 24, for example. A layer of SiO$_2$ may be deposited over the patterned silicon or whole wafer, for example.

Conventional Si/SiO$_2$ processing techniques may be used to form the waveguding MZI core and cladding structure. For example, the lower oxide cladding may take the form of a buried oxide layer produced over a silicon substrate by the Unibond technique, developed by Soitec. E-beam lithography may be used to define the MZI waveguide structure in poly(methyl methacrylate), which may be subjected to a lift-off process to provide an Al mask that may be used to reactive ion etch the Si layer in a CF$_4$:Ar$_2$ (2:1) etching environment. A layer of SiO$_2$ may be sputtered over the resulting core and lower cladding structure. Input and output facets for the Si waveguide may be provided. Alternatively, the MZI waveguide structure may be incorporated onto a larger Photonic Integrated Circuit (PIC) chip including a suitable optical signal source and/or sensor, such as a diode laser and photo-diode. Temperature compensation for one or more of the source, waveguide and detector may be provided for as well.

According to an aspect of the present invention, the silicon substrate may be selectively thinned to define the bossed diaphragm. The silicon substrate may be selectively thinned using any suitable technique, such as etching or micro-machining, both by way of non-limiting example only. Formation of the boss and surrounding channel may occur prior or post waveguide processing. Alternatively, boss formation may occur substantially simultaneously with waveguide formation where wafer etching techniques are used, for example.

Figure 2:
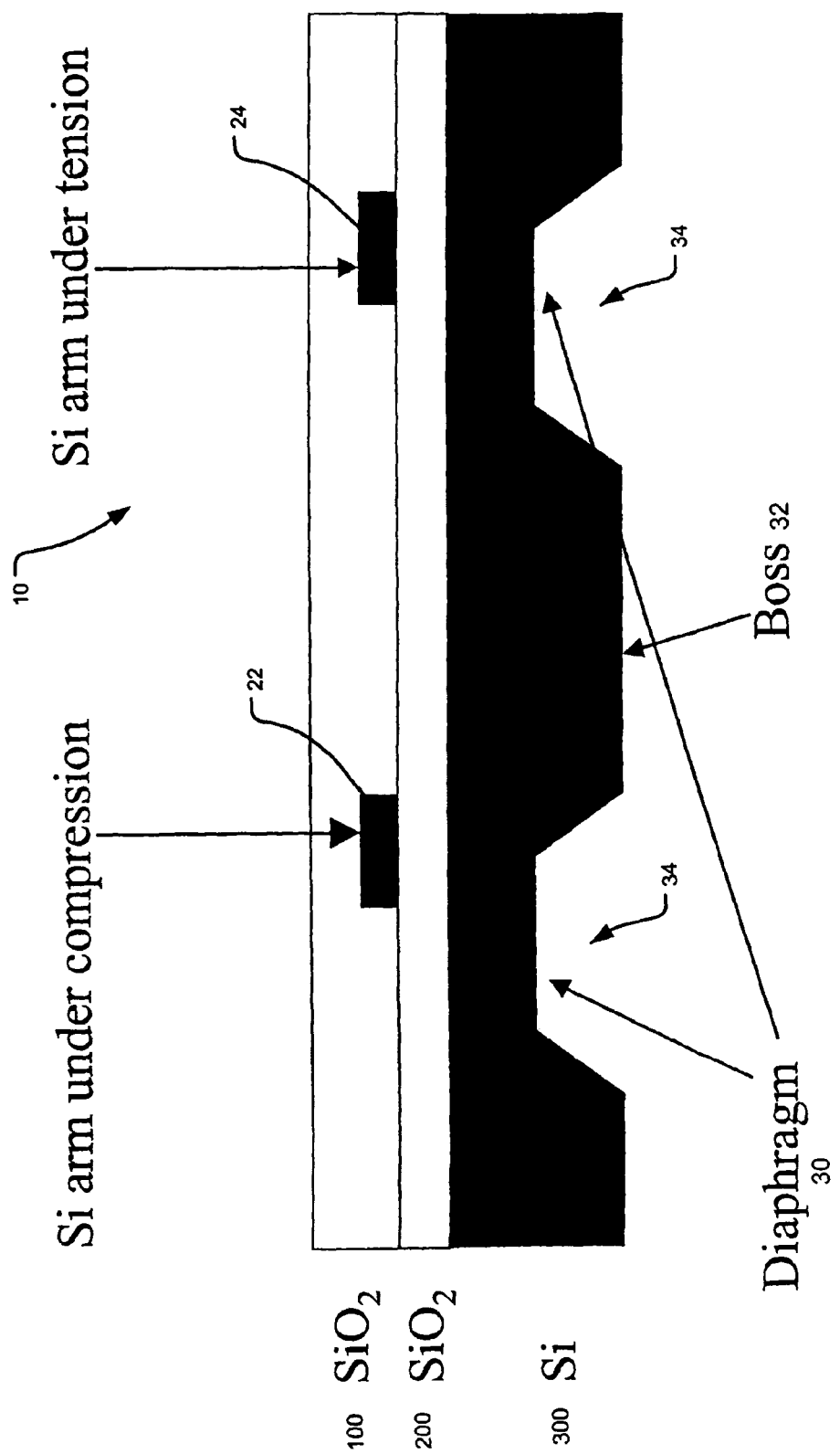

Referring now also to FIG. 2, there is shown a cross-section diagrammatic view of system 10 according to an aspect of the present invention. Again, system 10 generally includes a waveguide 20 (arms 22, 24 being shown) cladded by upper and lower cladding layers 100, 200 and boss diaphragm 30 in supporting Si substrate 300. As may be seen in FIGS. 1 and 2, boss diaphragm 30 generally includes a substantially central protuberance, or boss, 32 surrounded by a relatively thinned channel 34. Boss diaphragm 30 may be formed of silicon. In general, the diaphragm may be made of (100) material, by way of non-limiting example.

One arm 22 of the interferometer may be placed near an edge of the boss 32. This arm 22 is stressed compressively when the diaphragm 30 is deflected or pressurized. The other arm 24 may be placed near an edge of the diaphragm 30, substantially corresponding to an outer edge of channel 34. Arm 24 is placed in tension when the diaphragm 30 is deflected. According to an aspect of the present invention, by using a boss and stressing each arm in opposite directions, twice the phase change can be achieved as compared to that of a single MZI sensing arm and MZI reference arm for a same diaphragm deflection. This may facilitate the use of thicker, less deformable diaphragms for a given pressure to be sensed as compared to a single MZI sensing arm and MZI reference arm configuration—as a greater phase change may be realized responsively to less deflection. This may advantageously provide for higher pressure sensing devices to be realized, and better device durability. Boss diaphragm 30 may also provide a stop for overpressure protection.

In other words, according to an aspect of the present invention a push-pull type configuration may advantageously be employed. By carefully positioning the interferometer arms with respect to the boss and diaphragm, the stress on the arms may be made to be equal in magnitude and opposite in sign. When the diaphragm 30 deflects, stress applied to the silicon core of the waveguide 20 arms 22, 24 causes a change in the index of refraction for light polarized in the direction of the stress consistent with the piezo-optic effect. Because the index of refraction of the two arms 22, 24 become unequal when the diaphragm is pressurized, the optical pathlength for light in the arms becomes unequal, which causes a phase difference as the optical signals recombine into waveguide 20'. In this way, the amount of interference, such as destructive interference, and thus the intensity of the light output from the interferometer varies with pressure. This intensity change, and hence the applied pressure, may be sensed using a sensor suitable for detecting the recombined signals, such as a photo-diode, for example.

The maximum amount of interference (ideally zero light output) occurs when the total phase difference is π. However, since the stress applied to each branch is of opposite sign, the change in the index of refraction, and hence phase, is also of opposite sign. Thus, according to an aspect of the present invention, for a total phase difference of π, the phase change for each branch or arm 22, 24 may be ±π/2.

The phase change for each arm may be given by:

$$\Delta\phi = \frac{2\pi\Delta n}{\lambda n}L$$

where Δϕ is the phase change, λ is the wavelength of the propagating light, Δn is the change in index of refraction, n is the unstressed index of refraction, and L is the length of the interferometer arms under stress.

The change of index of refraction due to the piezo-optic effect Δn may be approximated by:

$$\Delta n \approx C\sigma$$

where C is the piezo-optic coefficient and σ is the stress applied to the silicon core of the waveguide.

Consistently, one may design an interferometer and diaphragm combination to induce a maximum phase shift (zero light output) at a desired input pressure. For example, using a wavelength of 1.55 μm, and index of refraction of 3.5, a target stress of 20,000 PSI and a piezo-optic coefficient of $2\times10^{-12}$ cm$^2$/dyne=$3.5\times10^{-8}$ PSI, one may calculate a length of the interferometric arms to be about 1,900 μm or about 75 mil.

According to an aspect of the present invention, compact optical pressure sensors may be provided. As the length (L) of each of the arms in a sensor according to an aspect of the present invention contributes to the phase differential upon recombination, shorter arms may potentially be used as compared to a single MZI sensing arm/reference arm configuration where the length of only one arm contributes to the sensed change.

Further yet, although FIG. 1 shows the transmitting material, e.g., waveguide 20, as a single straight line, other shapes, such as the resistor pattern shown in U.S. Pat. No. 5,891,751, the entire disclosure of which is hereby incorporated by reference as if being set forth in its entirety herein, may be used. For example, the use of such a pattern may provide for increased optical path lengths in the interferometer arms for a given chip size, as compared to straight arms. This may serve to provide higher sensitivity without increasing the size of the chip.

Such a configuration may be achievable through the use of highly confining Si waveguiding cores and $SiO_2$ cladding. Further, corner mirrors may be well suited for use with the SOI material system of the present invention, to further facilitate the production of low-loss tortuous waveguides.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A pressure sensor comprising:
    a deflectable diaphragm including a first thinned channel, a second thinned channel and a substantially central boss;
    an optical waveguide having first and second arms on the deflectable diaphragm, said first arm is substantially aligned with an edge of said boss above the first thinned channel and said second arm is substantially aligned with an edge of said second thinned channel, wherein said first arm is under compression and said second arm is under tension when a pressure is applied to said diaphragm;
    a light source coupled to said optical waveguide for introducing light to said waveguide; and
    a light detector coupled to said waveguide for detecting changes in the intensity of light.

2. The sensor of claim 1, wherein said waveguide comprises a Si core.

3. The sensor of claim 2, wherein said waveguide further comprises a $SiO_2$ upper cladding.

4. The sensor of claim 3, wherein said waveguide further comprises a $SiO_2$ lower cladding.

5. The sensor of claim 3, wherein said waveguide further comprises a buried oxide layer.

6. The sensor of claim 5, wherein said boss comprises silicon.

7. The sensor of claim 5, wherein said boss is formed in a silicon substrate.

8. The sensor of claim 7, wherein said boss is micro-machined from said silicon substrate.

9. The sensor of claim 1, further comprising at least one of an infrared signal source and an infrared signal detector.

10. A method for making an optical pressure sensor comprising:
    selectively thinning a Si containing wafer to include a first thinned channel and a second thinned channel on opposing sides of a substantially central boss; and
    forming an optical waveguide having first and second arms, said first arm being substantially aligned with an edge of said boss above the first thinned channel and said second arm being substantially aligned with an edge of said second thinned channel, wherein said first arm is under compression and said second arm is under tension when a pressure is applied to a diaphragm.

11. The method of claim 10, wherein said forming an optical waveguide comprises providing a Si waveguide core.

12. The method of claim 11, wherein said forming an optical waveguide further comprises sputtering a $SiO_2$ upper cladding over said Si waveguiding core.

13. The method of claim 10, wherein said forming an optical waveguide comprises forming a Si waveguiding core over a $SiO_2$ lower cladding.

14. The method of claim 10, wherein said forming an optical waveguide comprises forming a Si waveguiding core over a buried oxide layer.

15. The method of claim 10, wherein said thinning comprises micro-machining.

16. The method of claim 10, further comprising optically coupling said waveguiding to at least one of an infrared signal source and an infrared signal detector.

* * * * *